Patented Apr. 3, 1951

2,547,150

UNITED STATES PATENT OFFICE 2,547,150

POLYMERIZATION OF BUTADIENE HYDRO-CARBONS IN THE PRESENCE OF A TRI-THIOCARBONATE

Edward S. Blake and John R. Durland, Nitro, W. Va., assignors to Monsanto Chemical Company, St. Louis, Mo., a corporation of Delaware No Drawing. Application November 7, 1944, Serial No. 562,409

7 Claims. (Cl. 260—84.3)

The present invention relates to a process for the preparation of butadiene polymers. More particularly, the invention relates to rubber-like polymers of butadiene hydrocarbons.

Synthetic sulfur-vulcanizable polymers of butadiene compounds which resemble natural rubber are made, for instance, by polymerizing butadiene-1,3 in aqueous emulsion in the presence of suitable vinyl compounds copolymerizable therewith. It is well known that the quality and usefulness of the copolymers are determined largely by the substances present, along with the polymerizable components, during the polymerization process. A substance, usually an oxygen yielding substance, is added to promote the polymerization so that it can be completed within a reasonably short time at low temperature. Other auxiliary agents such as emulsifying agents and a material which exerts a regulating effect upon the polymerization are usually added. The purpose of the regulating agent is to control the polymerization to obtain a polymer which more closely resembles unvulcanized natural rubber. Otherwise, the polymerization easily results in hard insoluble products which are more like vulcanized rubber than the unvulcanized variety. As a consequence, the polymer is difficult to mill and compound. It is therefore common practice to add a regulating agent to a butadiene emulsion before the polymerization step.

Among the objects of this invention is to provide a new class of regulating agents. A particular object of the invention is to provide a class of regulating agents which under a variety of conditions consistently control the polymerization of butadiene compounds so that products closely resembling unvulcanized natural rubber are produced. Another object is to provide a class of regulating agents which can be prepared easily and cheaply. Other objects will be apparent from the detailed description following.

In accordance with this invention it has been discovered that aryl methyl esters of thiol acids exert a remarkable regulating effect upon the course of the polymerization of butadiene compounds. They control the polymerization so that plastic easily worked polymers are produced. A small proportion based on the monomeric constituents is sufficient and exerts a marked effect on the polymerization. Less than 1.0% is usually sufficient and in general 0.2–0.5% give optimum results. The pH of the emulsion affects the activity of the new regulators. For instance, the activity increases with increasing pH so that the pH of the emulsion as well as the amount of regulator may be adjusted to give precisely the activity desired. While the polymerization may be conducted in alkaline, neutral or acid medium, best results with the new regulators are obtained at pH 7–11.5.

Typical examples of aryl methyl esters of thiol acids which may be used in the practice of this invention comprise di-(β-naphthyl methyl) trithiocarbonate, β-naphthyl methyl ethyl xanthate, benzyl trithiocarbonates, as for example benzyl ethyl trithiocarbonate, o-chlor benzyl ethyl trithiocarbonate, p-chlor benzyl butyl trithiocarbonate, o-chlor benzyl butyl trithiocarbonate, benzyl isopropyl trithiocarbonate, dibenzyl trithiocarbonate, di-(p-chlor benzyl) trithiocarbonate, trichlor benzyl n-butyl trithiocarbonate, benzyl amyl trithiocarbonate, dichlor benzyl butyl trithiocarbonate and di-(dichlor benzyl) trithiocarbonate. Other suitable compounds are di-(S-benzyl) dithiocarbonate, benzyl benzyl xanthate, S-benzyl ethyl monothiocarbonate, S-benzyl butyl monothiocarbonate, benzyl diethyl dithiocarbamate, benzyl diamyl dithiocarbamate, the benzyl ester of benzothiolic acid and chlor benzyl esters of benzothiolic acid, benzyl thiol acetate and dibenzyl thiol phthalate.

The new process can be applied to the polymerization of substituted butadiene-1,3 as well as to butadiene-1,3 itself as for example, isoprene, 2,3-dimethyl butadiene and piperylene including mixtures of butadiene-1,3 compounds with polymerizable mono-olefines containing the structure

Examples of the latter comprise styrene, acrylonitrile, methacrylonitrile, vinyl naphthalene, vinyl furane, methyl acrylate, methyl vinyl ether, methyl vinyl ketone and the like. The polymerizations may be conducted in a homogeneous system or in a heterogeneous system. The present accepted method for making synthetic sulfurvulcanizable butadiene polymers is by polymerization in aqueous emulsion so the process will be described in detail with respect to this type of polymerization.

The following examples illustrate the invention but the invention is by no means limited thereto.

Benzyl trithiocarbonates were employed as regulating agents for the polymerization of butadiene-1,3 and styrene in aqueous emulsion at a pH of about 7.3. The charge was as follows:

| | Parts by weight |
|---|---|
| Butadiene | 75. |
| Styrene | 30. |
| Water | 261. |
| Potassium persulfate | 0.52 |
| Decyl benzene sodium sulfonate | 4.7 |
| $NaH_2PO_4$ | 0.92 |
| $Na_2HPO_4$ | 3.82 |

A small amount of a benzyl trithiocarbonate was added to the emulsion and polymerization effected by heating and stirring the charge 24 hours at 50° C. in a glass lined autoclave. The rubber was then coagulated and separated from the aqueous vehicle and dried. Good yields of plastic polymers were obtained. Plasticities of typical rubber copolymers as determined on a Firestone extrusion plastometer described by J. H. Dillon, Rubber Chemistry and Technology, Vol. 9, pp. 496–501 (1936) are set forth in the table below:

Table I

| Per Cent Based on Monomers | Regulating Agent | Firestone Plasticity, Seconds |
|---|---|---|
| | None | >500 |
| 0.5 | Di-(o-chlor benzyl) trithiocarbonate | 94 |
| 0.3 | Benzyl n-butyl trithiocarbonate | 84 |
| 0.2 | Benzyl methyl trithiocarbonate | 44 |
| 0.5 | Di-(phenyl chlor methyl) trithiocarbonate | 92 |
| 0.5 | o-Chlor benzyl n-butyl trithiocarbonate | 25 |

Butadiene and styrene were polymerized in aqueous emulsion at a pH of about 9 employing aryl methyl esters of thio acids as regulating agent. The charge consisted of

| | Parts by weight |
|---|---|
| Butadiene-1,3 | 112.5 |
| Styrene | 37.5 |
| Water | 225. |
| Potassium persulfate | 1.5 |
| Ivory Snow | 4.5 |

A small proportion based on the total monomers present of regulating agent was added to the emulsion and polymerization carried out by heating and stirring the above charge in a glass lined autoclave 22 hours at 50° C. after which the copolymer was coagulated and dried. Good yields of rubbery copolymer were obtained. Plasticities were determined on a Firestone extrusion plastometer as described above. The table below sets forth typical plasticity data obtained by use of the new regulating agents.

Table II

| Per Cent Based on Monomers | Regulating Agent | Firestone Plasticity, Seconds |
|---|---|---|
| | None | >500 |
| 0.5 | Di-(o-chlor benzyl) trithiocarbonate | 12 |
| 0.2 | Di-benzyl trithiocarbonate | 14 |
| 0.5 | Benzyl ethyl xanthate | 26 |
| 0.3 | Benzyl carbethoxy trithiocarbonate | 8 |
| 0.5 | Di-(trichlor benzyl) trithiocarbonate | 74 |
| 0.5 | Di-(β naphthyl methyl) trithiocarbonate | 19 |
| 0.5 | Trichlor benzyl ester of benzothiolic acid | 15 |
| 0.5 | Banzyl ester of benzothiolic acid | 43 |
| 0.5 | S-Trichlor benzyl, ethyl monothiocarbonate | 27 |
| 0.5 | S-Benzyl, ethyl monothiocarbonate | 40 |
| 0.5 | Trichlor benzyl diethyl dithiocarbamate | 16 |
| 0.5 | α Naphthyl ethyl xanthate | 6 |

Butadiene and styrene were copolymerized in aqueous emulsion at a pH of about 11.5. The charge was as follows:

| | Parts by weight |
|---|---|
| Butadiene-1,3 | 112.5 |
| Styrene | 37.5 |
| Water | 225. |
| Potassium persulfate | 1.5 |
| Ivory Snow | 4.5 |
| Sodium hydroxide | 1.15 |

Substantially 0.3% based on the total monomers present of di-(o-chlor-benzyl) trithiocarbonate was added to the emulsion. This emulsion was stirred and heated in a glass lined autoclave 22 hours at 50° C. The latex of the copolymer was then coagulated and the rubbery coagulum dried. The yield of copolymer was about 90% based on the monomers charged and the plasticity measured on a Firestone extrusion plastometer 6 seconds.

The present invention allows the manufacture of synthetic sulfur-vulcanizable butadiene polymers which can be processed in the factory in a manner similar to that followed for processing natural rubber in the manufacture of rubber articles. Obviously, many variations can be made in the specific formulas set forth to illustrate the invention without departing from the spirit or scope of the present invention. The present invention is limited solely by the claims attached hereto as part of the present specification.

What is claimed is:

1. The process of regulating polymerization which comprises polymerizing a monomeric mixture containing butadiene-1,3 and styrene in the form of an aqueous emulsion in the presence of 0.3–0.5% based on the total monomers present of a benzyl trithiocarbonate possessing the structure

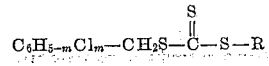

where $m$ is a number less than four and R is an alkyl radicle.

2. The process of regulating polymerization which comprises polymerizing a monomeric mixture containing butadiene-1,3 and styrene in the form of an aqueous emulsion in the presence of 0.3–0.5% based on the total monomers present of a benzyl trithiocarbonate possessing the structure

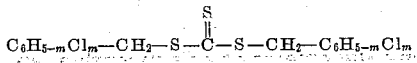

where $m$ is a number less than four.

3. The process of regulating polymerization which comprises polymerizing a monomeric mixture containing butadiene-1,3 and styrene in emulsion form in the presence of an effective amount less than 1% based on the total monomers present of di-(o-chlor-benzyl) trithiocarbonate.

4. The process of regulating polymerization which comprises polymerizing a monomeric mixture containing butadiene-1,3 and styrene in emulsion form in the presence of an effective amount less than 1% based on the total monomers present of benyl butyl trithiocarbonate.

5. The process of regulating polymerization which comprises polymerizing a monomeric mixture containing butadiene-1,3 and styrene in emulsion form in the presence of an effective amount less than 1% based on the total monomers present of dibenzyl trithiocarbonate.

6. The process of regulating polymerization which comprises polymerizing a monomeric mixture containing a butadiene-1,3 hydrocarbon and styrene in the form of an aqueous emulsion in the presence of an effective amount less than 1% based on the total monomers present of a trithiocarbonate possessing the structure

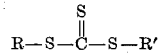

where R represents an aromatic substituted methyl radical, where R' represents a radical selected from the group consisting of alkyl radicals and aromatic substituted methyl radicals, and where said aromatic substituents consist solely of the elements selected from the group consisting of carbon, hydrogen, and chlorine.

7. The process of regulating polymerization which comprises polymerizing a monomeric mixture containing butadiene-1,3 and styrene in the form of an aqueous emulsion in the presence of an effective amount less than 1% based on the total monomers present of a trithiocarbonate possessing the structure

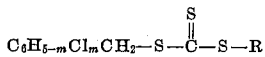

where R represents an aromatic substituted methyl radical, where said aromatic substituent consists solely of the elements selected from the group consisting of carbon, hydrogen, and chlorine, and where $m$ represents a number less than four.

EDWARD S. BLAKE.
JOHN R. DURLAND.

REFERENCES CITED

The following references are of record in the file of this patent:

UNITED STATES PATENTS

| Number | Name | Date |
|---|---|---|
| 2,376,339 | Browning | May 22, 1945 |
| 2,380,400 | Browning | July 31, 1945 |
| 2,380,401 | Browning | July 31, 1945 |
| 2,380,402 | Browning | July 31, 1945 |
| 2,396,997 | Fryling | Mar. 19, 1946 |
| 2,430,562 | Fryling | Nov. 11, 1947 |

OTHER REFERENCES

Concise Chemical and Technical Dictionary (Bennett), Chem. Pub. Co. 1947, pp. ix, xix, and 76.

Snyder et al., J. Am. Chem. Soc., vol. 68, Aug. 1946, pp. 1422, 1426 and 1427.